United States Patent [19]
Priebe

[11] 3,811,509
[45] May 21, 1974

[54] WELL DRILLING METHOD

[75] Inventor: Frank D. Priebe, Houston, Tex.

[73] Assignee: Cities Service Oil Company, Tulsa, Okla.

[22] Filed: Aug. 31, 1972

[21] Appl. No.: 285,143

[52] U.S. Cl.................... 166/293, 166/294, 175/65
[51] Int. Cl..................... E21b 21/04, E21b 33/138
[58] Field of Search............................ 166/292–294, 166/.5; 175/65, 70, 72, 5, 61

[56] References Cited
UNITED STATES PATENTS

| | | | |
|---|---|---|---|
| 3,208,523 | 9/1965 | Coyle et al.......................... | 166/292 |
| 3,028,913 | 4/1962 | Armentrout........................ | 166/292 |
| 2,990,016 | 6/1961 | Goins, Jr. et al. ............... | 166/294 X |
| 3,228,469 | 1/1966 | Kern et al.......................... | 175/72 X |
| 2,943,680 | 7/1960 | Scott, Jr. et al. ................ | 166/294 X |
| 3,496,902 | 2/1970 | Cleary et al. ..................... | 175/72 |

*Primary Examiner*—Stephen J. Novosad
*Attorney, Agent, or Firm*—A. Joe Reinert; John W. Carpenter; Elton F. Gunn

[57] ABSTRACT

A method is disclosed for reducing drilling torque and preventing sticking of drilling pipe when a permeable formation such as sand is penetrated during the drilling of a well. The reduction in drilling pipe torque which results is particularly advantageous in the drilling of deviated holes.

A slug of gel slurry is deposited in the hole after the permeable formation has been entered, and the slug is then squeezed at a calculated pressure which causes liquid from the slurry to migrate from the hole into the formation. However, the bulk of the gel is filtered out by the formation at or near the wall of the hole, and is thus laid down as a packed cake with the formation itself serving as the matrix on which the cake forms. The squeeze is carried out at a pressure which is substantially greater than the hydrostatic pressure at the point being squeezed and at least equals the greatest pressure which is expected to exist later on at the side of the squeeze after drilling has proceeded to a greater depth. The resulting gel cake is dense enough to seal the wall of the hole and thereby substantially negates loss of fluid from the drilling mud into the formation. Preventing loss of fluid into the formation by means of the gel cake also provides the additional advantage of curtailing inward growth of the hole wall by build-up of drill cuttings thereon. Circulation of drilling mud remains adequate and provides good lubrication between the pipe and the wall of the hole even during sharply deviated drilling. As drilling continues, the integrity of the gel cake is not detrimentally affected by further elevation of pressure where the cake resides in the hole since the squeeze pressure for the formation thereof was at least as great as will later exist at that point from use of higher density drilling mud, greater casing pressure, etc.

26 Claims, 1 Drawing Figure

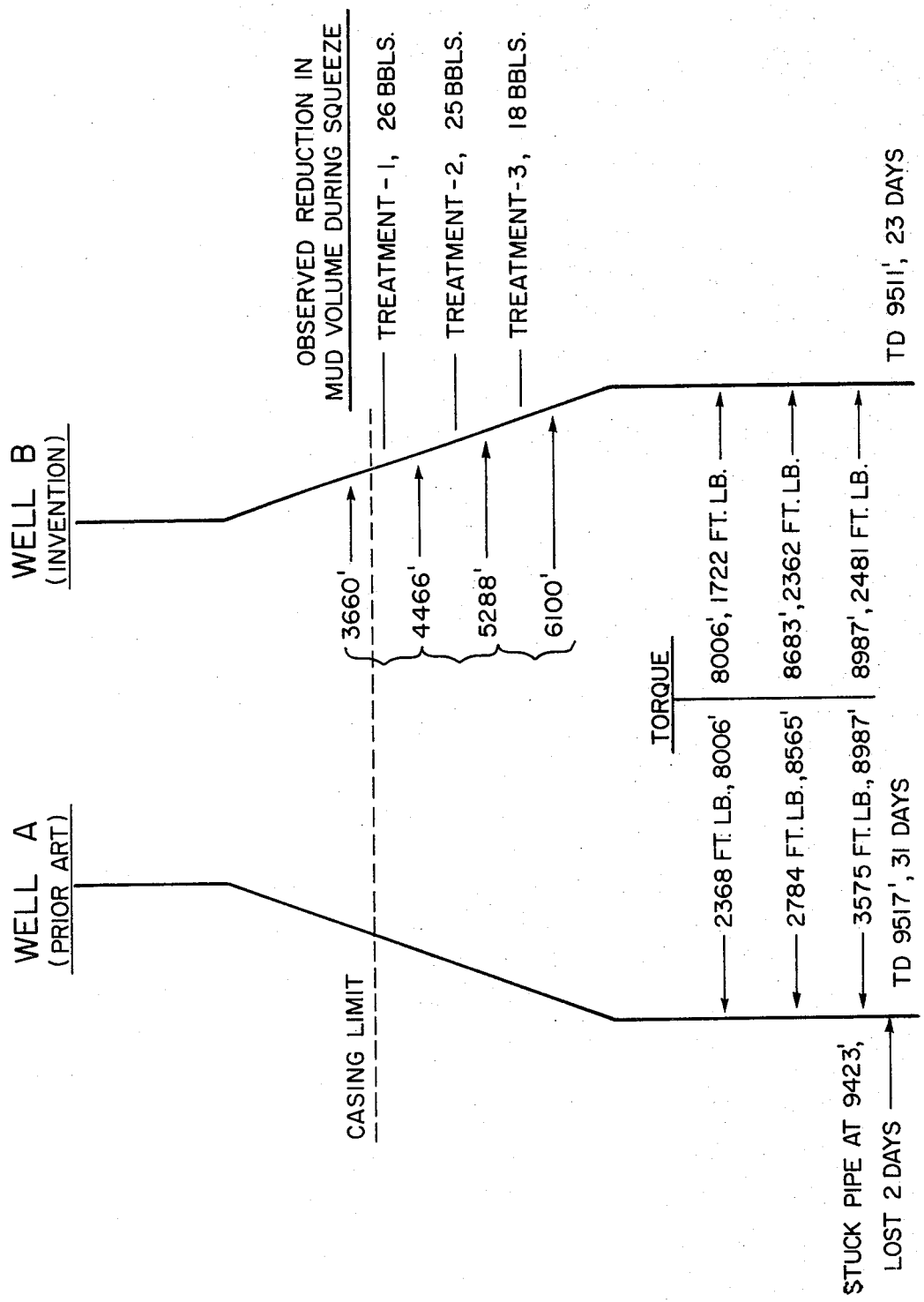

WELL DRILLING METHOD

BACKGROUND OF THE INVENTION

The present invention pertains to the drilling of wells and more particularly to open hole drilling operations wherein a drill pipe is lubricated by circulation of drilling mud from the bottom to the top of the hole during drilling. This invention is especially adaptable to petroleum recovery wells when drilling through permeable geological formations in order to reach a producing reservoir.

In the drilling of a well it is often necessary to penetrate permeable formations such as porous sand deposits. If the drilling operation involves use of an open rather than a cased hole through such a formation, there is the possibility of losing adequate lubrication between the drilling pipe and the wall of the hole. Torque can become excessive, even to the point where the pipe twists off, or the pipe can become stuck in the hole. These difficulties become particularly aggravated when the hole is deviated.

In order to obviate the aforementioned problems of excessive torque and pipe sticking various lubricating additives, including hydrocarbon oils, have been incorporated into the drilling fluid or else an oil has been freely spotted directly onto the rubbing or binding surfaces within the hole. Since even more concerted efforts are now made to control pollution of waters by accidentally spilled or wasted oils, it has become imperative to find other methods of reducing torque and preventing sticking of pipe. Organic lubricants which will readily disperse or dissolve in water have been tried, examples of which are silicates, detergents, halogenated or sulfonated paraffins, alcohols, castor oil-alcohol blends and ethyloxylated phenol. Practical application of these materials is limited and the use of some is inordinately expensive because of the price and the large quantities required. As a consequence, a need has continued to exist for reducing drilling torque and preventing the sticking and twisting off of pipe when drilling is carried out through an open hole in a permeable formation such as a massive sand deposit or sand interbedded in shale.

SUMMARY OF THE INVENTION

It is therefore an object of this invention to improve lubricity between a drilling pipe and the wall of a hole in an open hole drilling operation.

Another object is to reduce drilling torque during drilling of a well.

One other object is to reduce torque on a drilling pipe during rotation so that the stress thereon is reduced and drilling can proceed with a higher factor of safety.

Still another object is to prevent the sticking of drilling pipe in a well hole.

Yet another object is to increase the rate at which a well can be drilled.

Even another object is to maintain lubricity between a drilling pipe and the wall of a well without use of a lubricating additive in the drilling mud.

Other objects and advantages of the invention will become apparent from the following description and the appended claims.

The present invention is employed in an open hole well drilling operation wherein a drill pipe having a drilling bit at the lower end is lubricated by circulation of drilling mud from the bottom to the top of the hole during the drilling operation. In accordance with the present invention a slug of gel slurry is deposited in the hole after a permeable formation has been entered by the drilling bit. The deposited slug is then squeezed in the hole at a precalculated pressure which causes liquid from the slurry to migrate into the interstices of the formation. However, the bulk of the gel agent, e.g., bentonite, is filtered out of the liquid by the formation at or near the wall of the hole, and is thus laid down as a packed cake. Squeezing is continued at the precalculated pressure until migration of fluid is no longer observed. The pressure employed during the squeeze is substantially greater than the hydrostatic pressure at the point being squeezed, and is at least about equal to the greatest pressure which is expected to exist later on at the site of the squeeze after drilling has proceeded to a greater depth.

The resulting gel cake is sufficiently thick and dense to seal the wall of the hole, and thereby substantially negates loss of fluid from the circulating drilling mud into the formation. In a sense, therefore, the gel cake amounts to a section of casing which has been formed in situ.

Besides merely providing continuity to the annulus through which the drilling mud flows upward, the gel cake also curtails the sometimes severe problem in open hole drilling of inward growth of the hole wall resulting from the continued deposition thereon of drill cuttings. The problem can become especially severe when it is necessary to increase the density of the drilling mud for drilling at greater depths. In such a case some of the drill solids which become entrained in the mud can have a size which prevents their passing into a permeable formation along with any fluid being lost thereto. However, the configuration of many of the aggregates is such that they at least partially enter the interstices of the formation, and since they also interlock with one another a deposit starts to build on the wall of the hole as these aggregates attempt to follow fluid which is being lost into the formation from the mud. Remaining permeable to flow of fluid from the mud, the deposit continues to grow in thickness until the annulus between the wall of the hole and the drill pipe is closed over. Extreme friction then results between the pipe and the wall of the hole due to insufficiency of drilling mud circulation.

By means of the present invention sealing of an open hole which extends through a permeable formation can be effectively accomplished so that circulation of drilling mud remains adequate for good lubrication between pipe and hole even when drilling is sharply deviated from the vertical. As drilling continues the integrity of the gel cake is not detrimentally affected by further elevation of pressure where it resides in the hole since the squeeze pressure employed in forming the cake is, deliberately, at least about as great as will later result at the site of the cake from use of a higher density drilling mud, a greater casing pressure, etc.

BRIEF DESCRIPTION OF THE DRAWINGS

The drawing illustrates the reduced torque, prevention of drill pipe sticking, and faster drilling rate which are made possible by the present invention.

DETAILED DESCRIPTION OF THE INVENTION

The term "gel" as used herein is with reference to particulate water insoluble substances which are used as viscosity control agents in well drilling muds. A large variety of particulate solids can thus be used, examples being classical bentonite gel, diatomaceous earth, starch, and certain polymeric compounds produced for use in drilling muds. Bentonite can be used to advantage. A gel slurry is produced by dispersing the gel agent in water, and sea water can be used in offshore drilling applications, although fresh water is sometimes preferred. To facilitate formation of a satisfactory cake during the squeeze, a fresh slurry can be used to particular advantage, i.e., a slurry which has not been circulated in the hole during drilling and which would thus contain drill bit cuttings dispersed therein. Various other ingredients can be incorporated into the gel slurry such as nut plug, starches, gums, or lubricants; but, as previously indicated, one object is to avoid use of lubricants, and specifically petroleum or other organic lubricants which are known to be harmful to an ecological environment.

The exact composition of the gel slurry employed for the squeeze can vary and depends upon the nature of the formation in which it is deposited, the depth of the deposit, etc. The amount and type of gel in the slurry is thus varied to permit formation of a satisfactory cake on the wall of the hole while taking into account the depth and specific characteristics of the particular permeable formation being treated.

When a formation is reached which is suspected of being able to rob fluid from the drilling mud and cause development of excessive torque as drilling continues, the fresh gel slurry is pumped down the drilling string and discharged into the hole through the bit. The slug is then squeezed to transfer the liquid thereof into the formation so that the gel cake is deposited on the wall of the hole. Squeezing is most effectively accomplished by raising fluid pressure in the hole significantly above the hydrostatic head pressure in the well at the site of the spotted slug. This can be effected by pumping mud over the slug after it is located, and restricting the return flow of the mud so that the mud pump is operating under a back pressure which is greater than normal. Sufficient back pressure can be obtained by use of blow-out preventers at the surface which have an adjustable choking mechanism, i.e., back pressure can be regulated by adjusting the size of the opening of the choke. However, hydrostatic pressure in the well can be at least partially relied upon in some instances to effect squeezing of the gel slurry, so that pumping of the mud does not always have to be completely relied upon for effective squeezing of the gel. This particularly applies at deeper intervals of depth and when using a gel slurry of relatively low solids content.

In any event the pressure applied to the spotted slug of gel slurry to effect the squeeze will be at least about as great as any pressure which is expected to exist in the hole at the site of the deposited gel cake during subsequent drilling at a greater depth. More specifically, hydrostatic pressure at any given point in the hole will become greater if the density of the drilling mud is increased. It may, for instance, be necessary to change over to a 12.5–13 pounds/gallon mud at depths below 6,000 feet following use of a 9–10 pound mud employed earlier and prior to depositing of a gel cake by a squeeze. As a consequence, hydrostatic pressure in the hole at the site of the deposited gel cake will become substantially increased by use of the heavier mud, but this increased pressure is anticipated at the time of the squeeze so that the gel cake can be laid down at a pressure which will be at least as great as any encountered subsequently. Otherwise, the cake can become ruptured or disintegrated by subjection to a pressure substantially higher than that at which it was formed, and it may not be dense enough to sufficiently prevent fluid loss and thus prevent wall growth as previously mentioned.

Precalculation of the pressure necessary for satisfactory deposition of a gel cake is not difficult for an experienced driller having knowledge of the formations being drilled and the pressures which he expects to encounter, for with such knowledge he can predict with reasonable accuracy the maximum mud weights and casing pressures that will be necessary for completing the hole, and he can thence arrive at the pressure which will be necessary to effect a satisfactory squeeze.

As was previously indicated, squeezing of the slug of gel slurry can be accomplished by circulating drilling mud under pressure after the slurry has been spotted in the hole. To accomplish this without displacing the slug to an undesired location or flushing it from the well, the drilling bit can be raised to a level above the slug before circulation of the mud under pressure is commenced. The occurence and extent of depositing of the slurry in the formation is determined by observing for change in the mud volume being circulated, i.e., a significant reduction in the volume shows that liquid of the slurry is passing into the formation. Good results have been observed when the pumping pressure is raised in increments and is maintained at each increment of pressure until a significant reduction in volume of the drilling mud has been determined. The squeeze can be concluded when a significant reduction in mud volume is no longer observed after elevation and holding of the pressure several times. For example, the mud pressure can be raised 100 psi or more when mud circulation is first started after spotting the slurry and this pressure held for 15– 90 minutes. If a significant reduction in mud volume is observed at the end of this time, the pressure can again be raised still higher and held for an additional length of time. Successive elevation and holding of pressure is continued until the precalculated squeeze pressure is reached and reduction of mud volume is insignificant or nil. For the purpose of this invention a significant reduction in mud volume is regarded to be several barrels, e.g., 3–5 barrels. It will be appreciated that observed reduction of mud volume is an indication of the amount of gel slurry liquid which has been squeezed into the formation and is, therefore, also an indication of the amount of gel agent which has been deposited in the form of a cake. Generally, at least about 10 barrels of slurry should be deposited by squeezing and satisfactory results are usually obtained with deposits within the range of about 20 to about 100 barrels.

When the penetrated formation needing treatment is relatively thick, more than one slug of gel slurry can be deposited at different depth intervals. In such a case squeezing of a slug into the formation subsequent to squeezing of a previous slug can be carried out at lower total pressure than was applied to the previous slug. This helps to preserve the integrity and porosity of any previously formed cake. Using an equivalent or higher pressure can sometimes fracture the cake or force drilling cuttings or other undesirable matter into the interstices thereof.

For carrying out the squeeze, gel slurry can be spotted over a rather elongated interval in order to treat the hole for a considerable distance along its length. The treated length can thus exceed 100 feet, and can commonly be within the range of about 300 to about 1,000 feet. In addition, the treatments can be spaced so that they overlap and thus provide an uninterrupted deposition of gel slurry and cake formation between one treatment site and the next.

The invention can, of course, be employed for drilling holes which are substantially vertical but it can be used to particular advantage when drilling is deviated, and especially when the deviation passes through a permeable formation, since the effects of deviation and the fricitional characteristics between the pipe and formation become compounded and considerably aggravate the aforementioned problems of excessive drilling torque and pipe sticking. In such a case one or more slugs of the gel slurry are deposited in the formation in accordance with the present invention, and it should be pointed out that the present method has been used to advantage in formations which contain sand deposits, and can be employed to particular advantage in massive sand formations which reside near the surface, but it can also be employed in other formations, e.g., carbonaceous deposits such as dolomite. The invention therefore is suitable for the drilling of deviated holes through massive near-surface sands, e.g., in offshore drilling operations wherein excessive torque, pipe sticking and ecological protection are a large problem and deviated holes are commonly drilled.

Although the amount of particulate solid used as the gel agent in the slurry can vary, it has been found that an amount within the range of about 20 to about 40 pounds per barrel of slurry can be employed to advantage. Bentonite is a suitable gel agent but other previously mentioned materials can also be used. Plugging agents can also be incorporated into the slurry, generally within the range of about 5 to about 10 pounds per barrel, and finely pulverized nut shells have been found suitable for the purpose.

EXAMPLES

A first offshore well, Well A, was drilled in accordance with techniques of the prior art. In the upper levels casing was employed, i.e., 30 inch drive pipe at 400 feet, 16 inch casing to 1,000 feet, and 10¾ inch casing to 3,800 feet. The well was drilled open hole thereafter to a total depth of 9,517 feet. The hole was deviated over the interval of about 1,300 feet to about 6,500 feet, 18° deviation being observed at 4,700 feet, and was substantially vertical above and below the deviation, thus providing an S-shaped hole path. A massive sand formation extended from below the casing to a depth of about 6,100 feet. Well A was drilled with an ethyloxylated phenol lubricant added to the drilling mud. At the depth interval between about 8,000–9,000 feet, drilling torque was in the range of about 2,550–3,600 foot pounds. Drilling to TD required 31 days. The drilling bit became stuck at 9,423 feet and required 2 days to free.

Well B was drilled from the same platform using the same casing program employed with Well A. This well hole was also deviated over the interval between about 1,300 feet to 6,500 feet, 15° deviation being observed at 5,700 feet, and was substantially vertical above and below the deviation, thus also resulting in an S-shaped hole path. No lubricating additive was used in the drilling mud during the boring of Well B, but three slugs of gel slurry were deposited in the massive sand formation as indicated below:

Treatment No. 1

The gel slurry was made up with fresh water using 35 pounds of bentonite, 10 pounds of fine nut plug and 4 percent diesel oil per barrel of slurry. The slurry had a density of 8.7 pounds/gallon and a viscosity of 45 seconds. 88 barrels of this slurry were spotted over the interval between 3,660 feet and 4,466 feet. The bit was then picked up to 3,443 feet in order to circulate drilling mud having a density of 9.1 pounds/gallon above the spotted slug of slurry. Circulating pressure on the mud was increased incrementally through back pressure on the casing annulus at discharge pressure levels up to 300 psi with no observed reduction in drilling mud volume. Upon continued increase of pressure the first loss of fluid to the formation was noted at 405 psi where a decrease in mud volume of about 3 barrels was observed after 25 minutes. The circulation of mud was then continued for 20 minutes and no further loss of slurry into the formation was noted. The bit was thereafter lowered and drilling resumed.

Treatment No. 2

The gel slurry was made up from fresh water using 25 pounds of bentonite and 5 pounds of fine nut plug per barrel of slurry. The slurry density was 8.8 pounds/gallon and the viscosity was 45 seconds. 120 barrels of the slurry were spotted across the interval between 4,310 feet and 5,020 feet. The bit was then picked up into the casing and mud circulation was commenced at 100 psi casing discharge pressure using mud having a density of 9.4 pounds/gallon. A 25 gallon reduction in mud volume was observed in 95 minutes, after which the squeeze was terminated.

Treatment No. 3

The gel slurry was made up with frest water using 25 pounds of bentonite and 5 pounds of fine nut plug per barrel of slurry to provide a density of 8.8 pounds/gallon and a viscosity of 37 seconds. 120 barrels of this slurry were spotted in the hole across the interval between 5,125 feet and 6,100 feet. The bit was picked up into the casing in order to circulate mud having a density of 9.5 pounds/gallon above the spotted slug of slurry, and circulation was established across a wide open choke at the surface. Casing discharge pressure was 50 psi and a reduction in mud volume of 18 barrels was observed in 60 minutes.

After deposition of the third slug of slurry, drilling of Well B was then continued in the usual fashion until TD was reached at 9,511 feet. The density of the drilling mud at the time of TD was 12.0 pounds/gallon. In this case drilling torque at the depth interval between about 8,000–9,000 feet was in the range of about 1,725–2,500 foot pounds. Drilling was complete in 23 days at a cost savings (versus Well A) of about 40 percent. In addition, the drilling pipe did not become stuck.

Taking note of Treatments 1–3 on Well B, it can be seen that the slugs of gel slurry were deposited in the massive sand formation in the deviated section of the hole. Each slurry was spotted prior to squeezing over an interval having a length within the range of about 700–1,000 feet, and successively spotted slugs overlapped the spotting intervals of the previously treated interval by 100 or more feet. It will be understood, however, that the treatment intervals and any overlap thereof can be either somewhat shorter or longer than has been indicated herein, and that a larger or smaller number of treatments or even a single treatment can be employed.

Not evident from the foregoing description is the fact that the materials cost for the three treatments on Well B was about one-half of the cost of the lubricating additive, an ethyloxylated phenol, used during drilling of Well A. In addition, attempts to test formations in Well A by wire line retrieval resulted in loss of the tool. A fishing operation was required to recover the tool and no evaluation of the reservoir being tested was obtained. On the other hand, a wire line test was successfully completed in the S-shaped hole of well B.

Samples of the gel cake deposited on the open hole wall of Well B were retrieved and examined. Thickness of the cake was determined to be one-eigth of an inch, more or less, and the thickness was of course variable due to irregularities in the hole diameter. The cake contained imbedded grains of sand, demonstrating accretion of the sand by the gel during formation of the cake with resultant sealing of the wall of the hole.

Advantages and accomplishment of the objects of the present invention become more immediately apparent from the drawing which schematically represents the drilling data from Well A and Well B, which has been previously presented herein.

While the invention has been described with references to particular materials, conditions, drilling techniques, geological formations, and the like, it will nonetheless be understood that still other embodiments will become apparent which are within the spirit and scope of the invention defined in the following claims.

What is claimed is:

1. In an open hole well drilling operation wherein a drill pipe having a drilling bit at the lower end is lubricated by circulation of drilling mud from the bottom to the top of the hole during drilling, the method of treating the hole and thus reducing drilling torque requirements and preventing sticking of the drilling pipe when drilling through a permeable formation, the method comprising spotting a slug of gel slurry in the hole and then squeezing the slug of gel slurry against a section of the hole wall adjacent to the permeable formation by pumping drilling fluid into the hole above the spotted slug at a pressure which is at least as great as the maximum pressure which will exist in the section of the hole thus treated during subsequent drilling of the hole to a greater depth until a total reduction in the volume of the drilling mud of at least about 10 barrels is observed, and thereafter drilling beyond a section of the formation thus treated.

2. A process as in claim 1 wherein the observed total reduction in mud volume is within the range of about 20 to about 100 barrels.

3. In an open hole well drilling operation wherein a drill pipe having a drilling bit at the lower end is lubricated by circulation of drilling mud from the bottom to the top of the hole during drilling, the method of treating the hole and thus reducing drilling torque requirements and preventing sticking of the drilling pipe when drilling through a permeable formation, said method comprising spotting a slug of gel slurry in the hole and then squeezing the slug of gel slurry by pumping a drilling fluid into the hole above the spotted slug at a pressure which is at least about as great as the maximum pressure which will exist in the section of the hole thus treated during subsequent drilling of the hole to a greater depth until a significant reduction in the volume of the drilling mud is observed wherein:
   a. the slug of gel is discharged from the drilling bit and is thus spotted in the hole,
   b. the drilling bit is in a raised position above the slug after the slug has been spotted in the hole, and
   c. drilling mud is then circulated and the pumping pressure thereof is increased and maintained at the increased pressure until a significant reduction in volume of the drilling mud is observed.

4. In an open hole drilling operation wherein a drill pipe having a drilling bit at the lower end is lubricated by a circulation of drilling mud from the bottom to the top of the hole during drilling, the method of treating the hole and thus reducing drilling torque requirements and preventing sticking of the drilling pipe when drilling through a permeable formation, said method comprising squeezing a slug of gel slurry against a section of the hole wall adjacent to the permeable formation, thereafter drilling beyond the section of the formation thus treated, thereafter squeezing a second slug of gel slurry into at least one other section of the formation at a different interval of depth, and thereafter drilling beyond the section of the formation thus treated, wherein the second slug of gel slurry which is squeezed into the formation subsequent to squeezing of a previous slug is squeezed at a lower pressure than was exerted on the previous slug.

5. In an open and deviated hole rotary drilling operation wherein a drill pipe having a drilling bit at the lower end is lubricated by circulation of a drilling mud from the bottom to the top of the hole during drilling and wherein the hole deviates or is not vertical through a permeable formation; the process of treating the hole and thus reducing drilling torque requirements and preventing sticking of the drill pipe when the drill pipe is rotated within the permeable formation or withdrawn through the permeable formation; wherein the process of treatment comprises:
   a. interrupting rotary drilling with the drill pipe and bit,
   b. placing a slug of gel slurry into contact with the permeable formation,
   c. placing a fluid into the drill hole above the slug of gel slurry,
   d. applying sufficient pressure to the fluid above the gel slurry such that the gel slurry exerts a pressure against the permeable formation at least as great as the maximum pressure which will at any time be exerted by any fluid during the drilling of the well, but any such pressure of the drilling fluid and the gel slurry against any formation that is contacted by either such fluid or gel slurry must be less than the fracturing pressure of that formation,
   e. maintaining the pressure on the fluid of (d) until the pressure can be substantially maintained without substantial additional application of pressure, and f. resuming rotary drilling with the drill pipe and bit.

6. The process of claim 5 wherein the fluid of (c) is a gel slurry.

7. The process of claim 5 wherein the gel slurry is free from a propping agent.

8. The process of claim 5 wherein the pressure of (c) is maintained on the fluid by:
   aa. allowing the pressure to drop by a measurable increment to a lower pressure,
   bb. thereupon pumping additional of the fluid into the drill hole to restore the original pressure, and
   cc. repeating steps (aa) and (bb) until not more than five barrels of fluid are required to restore the pressure of (c) after not less than 15 minutes after step (aa).

9. The process of claim 8 wherein the gel slurry is free from a propping agent.

10. The process of claim 8 wherein the permeable formation comprises sand and wherein the drill hole is drilled from an offshore drilling platform.

11. The process of claim 8 wherein, subsequent to treatment additional drill hole is drilled and the steps of (a), (b), (c), (d), and (e) are repeated to treat the drill hole not previously treated, but at a pressure lower than the pressure applied in the first treatment.

12. The process of claim 5, wherein, following step (a):
   w. the gel slurry of step (b) is placed into contact with the permeable formation by injecting sufficient fresh gel slurry into the bottom of the drill hole through the drill pipe and drilling bit such that the gel slurry will extend to the top of a permeable formation to be treated when the drill pipe and drill bit is withdrawn to above the top of the permeable formation to be treated,
   x. the drill pipe and drill bit is withdrawn to above the top of the formation to be treated,
   y. the fluid of step (c) is the drilling mud and is placed into the drill hole above the slug of gel slurry by upward movement of the gel slurry injected in step (x), and
   z. the supplying and maintaining the pressure on the fluid of steps (d) and (e) is by circulating the drilling mud above the gel slurry through the drill pipe and drilling bit under back pressure at incrementally increasing pressures until the pressure of steps (d) and (e) is reached and not more than five barrels of fluid is lost in less than 15 minutes at the pressure of steps (d) and (e).

13. The process of claim 12 wherein the gel slurry is free from a propping agent.

14. The process of claim 12 wherein the permeable formation comprises sand and wherein the drill hole is drilled from an offshore drilling platform.

15. The process of claim 12 wherein, subsequent to treatment additional drill hole is drilled and the steps of (a), (b), (c), (d), and (e) are repeated to treat the drill hole not previously treated, but at a pressure lower than the pressure applied in the first treatment.

16. The process of claim 5 wherein the permeable formation comprises sand and wherein the drill hole is drilled from an offshore drilling platform.

17. The process of claim 5 wherein, subsequent to treatment additional drill hole is drilled and the steps of (a), (b), (c), (d), and (e) are repeated to treat the drill hole not previously treated, but at a pressure lower than the pressure applied in the first treatment.

18. The process of claim 5 wherein the gel slurry comprises a gel agent selected from bentonite, diatomaceous earth, drilling mud polymers, starch and mixtures thereof.

19. The process of of claim 18 wherein the gel slurry comprises bentonite dispersed in water.

20. The process of claim 19 wherein the content of gel agent in the slurry is within the range of about 20 to about 40 pounds per barrel of slurry.

21. The process of claim 20 wherein the gel slurry further comprises a plugging agent.

22. The process of claim 21 wherein the content of plugging agent is within the range of about 5 to about 10 pounds per barrel of slurry.

23. The process of claim 22 wherein the plugging agent is pulverized nutshells.

24. The process of claim 5 wherein the pressure is maintained until a cake of gel forms on the wall of the drill hole in the region of the permeable formation.

25. The process of claim 5 wherein the slug of gel slurry is spotted over a substantially elongated interval of the drill hole.

26. The process of claim 5 wherein at least 2 slugs of gel slurry are spotted at different intervals of depth in the hole and the intervals overlap one another.

* * * * *